US012617380B2

(12) United States Patent
Yoon et al.

(10) Patent No.: US 12,617,380 B2
(45) Date of Patent: May 5, 2026

(54) BRAKING CONTROL DEVICE AND BRAKING CONTROL METHOD

(71) Applicants:Hyundai Motor Company, Seoul (KR); Kia Corporation, Seoul (KR)

(72) Inventors: Kyung Ho Yoon, Suwon-si (KR); Yong Hwa Lee, Gwacheon-si (KR); Ho Wook Lee, Seoul (KR); Ki Young Kim, Incheon (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 178 days.

(21) Appl. No.: 18/371,953

(22) Filed: Sep. 22, 2023

(65) Prior Publication Data

US 2024/0359671 A1 Oct. 31, 2024

(30) Foreign Application Priority Data

Apr. 28, 2023 (KR) ........................ 10-2023-0056512

(51) Int. Cl.
*B60T 8/1761* (2006.01)
*B60L 7/18* (2006.01)
*B60L 7/26* (2006.01)

(52) U.S. Cl.
CPC ............ *B60T 8/17616* (2013.01); *B60L 7/18* (2013.01); *B60L 7/26* (2013.01); *B60T 2240/02* (2013.01);
(Continued)

(58) Field of Classification Search
CPC ............ B60T 8/17616; B60T 2240/02; B60T 2270/10; B60T 2270/602; B60T 2270/604;
(Continued)

(56) References Cited

U.S. PATENT DOCUMENTS 10,393,258 B2 8/2019 Zhao et al.
11,305,773 B1 4/2022 Semenov et al.
(Continued)

FOREIGN PATENT DOCUMENTS

CN 115009039 A * 9/2022 ................ B60L 7/18
JP 6648426 B2 2/2020
(Continued)

OTHER PUBLICATIONS

English translation of Huang et al. (CN 115009039) (Year: 2022).*

*Primary Examiner* — Kyle J Kingsland
(74) *Attorney, Agent, or Firm* — MORGAN, LEWIS & BOCKIUS LLP

(57) ABSTRACT

A braking control apparatus includes a driving information detector configured to detect a braking request from a driver while a vehicle is driving; and a vehicle controller configured to control a braking torque of the vehicle in response to the braking request from the driver, wherein the braking torque includes a regenerative braking torque formed by a motor and a hydraulic braking torque formed by a hydraulic brake, and wherein the vehicle controller is configured to perform regenerative braking using an initial regenerative braking torque determined by the braking request from the driver, using an initial regenerative braking torque determined by the braking request from the driver, and when wheel-slippage occurs, the vehicle controller reduces the regenerative braking torque to be less than the initial regenerative braking torque.

18 Claims, 7 Drawing Sheets

(52) U.S. Cl.
CPC ..... *B60T 2270/10* (2013.01); *B60T 2270/602* (2013.01); *B60T 2270/604* (2013.01)

(58) Field of Classification Search
CPC .... B60T 8/176; B60T 2270/608; B60T 8/172; B60T 13/10; B60T 2270/60; B60L 7/18; B60L 7/26; B60L 2240/423; B60L 3/108; B60L 15/2009; B60L 2240/465; B60Y 2400/81; Y02T 10/64
See application file for complete search history.

(56)  References Cited

U.S. PATENT DOCUMENTS

| | | | |
|---|---|---|---|
| 2010/0117567 A1* | 5/2010 | Jeon | B60T 1/10 |
| | | | 318/376 |
| 2018/0086209 A1* | 3/2018 | Jeon | B60T 8/17 |
| 2019/0193568 A1* | 6/2019 | Cho | B60T 8/17616 |
| 2021/0394727 A1* | 12/2021 | Lee | B60T 8/17551 |
| 2022/0227232 A1 | 7/2022 | Pettersson | |
| 2025/0074207 A1* | 3/2025 | Oguro | B60L 3/102 |

FOREIGN PATENT DOCUMENTS

| | | |
|---|---|---|
| JP | 2022-087983 A | 6/2022 |
| KR | 10-2319153 B1 | 10/2021 |

* cited by examiner

BRAKING CONTROL DEVICE AND BRAKING CONTROL METHOD

CROSS-REFERENCE TO RELATED APPLICATIONS

The present application claims priority to Korean Patent Application No. 10-2023-0056512 filed on Apr. 28, 2023, the entire contents of which is incorporated herein for all purposes by this reference.

BACKGROUND OF THE PRESENT DISCLOSURE

Field of the Present Disclosure

The present disclosure relates to a braking control device and a braking control method.

Description of Related Art

Recently, as interest in high-power, high-performance vehicles has increased, output of a vehicle has also increased. As an output of a vehicle increases, performance of a braking device suitable for increased output has also become more important.

A braking device of a hybrid or electric vehicle may be an integrated brake system using both regenerative braking of a motor and hydraulic braking of a hydraulic brake. In a general integrated brake system, when wheel-slippage occurs, by excluding regenerative braking torque and switching to hydraulic braking by regenerative stability control (RSC), braking force may be secured.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a braking control device and a braking control method of a vehicle which may obtain relatively high braking performance using regenerative braking even when wheel-slippage occurs during braking.

An aspect of the present disclosure is to provide a braking control device and a braking control method which may improve braking performance by increasing regenerative braking without changing a hydraulic braking device to a hydraulic braking device including a high thermal mass.

An aspect of the present disclosure is to provide a braking control device and a braking control method which may obtain relatively high fuel efficiency using regenerative braking.

An aspect of the present disclosure is to reduce a difference in a process of changing from regenerative braking to hydraulic braking which a driver may feel by maintaining regenerative braking even when wheel-slippage occurs.

According to an aspect of the present disclosure, a braking control device includes a driving information detector configured to detect a braking request from a driver while a vehicle is driving; and a vehicle controller configured to control a braking torque of the vehicle in response to the braking request from the driver, wherein the braking torque includes a regenerative braking torque formed by a motor and a hydraulic braking torque formed by a hydraulic brake, and wherein the vehicle controller is configured to perform regenerative braking using an initial regenerative braking torque determined by the braking request from the driver, and in response that wheel-slippage occurs, the vehicle controller is configured to reduce the regenerative braking torque to be less than the initial regenerative braking torque.

The regenerative braking torque may be a sum of a predetermined coasting regenerative braking torque and an allowable regenerative braking torque, and the vehicle controller may reduce the regenerative braking torque to be less than the initial regenerative braking torque by reducing the allowable regenerative braking torque.

The vehicle controller may operate an electric brake-force distribution function in response that an amount of wheel-slippage of a rear wheel in the vehicle is greater than a first rear wheel reference value and less than a rear wheel limit reference value.

When the amount of the wheel-slippage of the rear wheel is greater than a second rear wheel reference value and less than a third rear wheel reference value, the vehicle controller may reduce regenerative braking torque of the rear wheel to be less than initial regenerative braking torque of the rear wheel.

In response that an amount of wheel-slippage of a front wheel in the vehicle is greater than a first front wheel reference value and less than a second front wheel reference value, the vehicle controller may reduce a regenerative braking torque of the front wheel to be less than an initial regenerative braking torque of the front wheel.

The vehicle controller may be configured to determine the regenerative braking torque by feedback control according to the amount of wheel-slippage when the wheel-slippage occurs.

The vehicle controller may release regenerative braking when the regenerative braking torque determined by the feedback control is less than a predetermined coasting regenerative braking torque.

The regenerative braking torque determined by the feedback control is within a determined range of the initial regenerative braking torque, the vehicle controller may terminate the feedback control.

The regenerative braking torque may be at least one of a front wheel regenerative braking torque and a rear wheel regenerative braking torque.

The amount of the wheel-slippage of the rear wheel may be greater than a third rear wheel reference value and less than a rear wheel limit reference value, the vehicle controller may operate an anti-lock braking system.

When the anti-lock braking system operates, the vehicle controller is configured to adjust the regenerative braking torque to be a predetermined value.

According to an aspect of the present disclosure, a braking control method includes a first operation of performing a regenerative braking using an initial regenerative braking torque according to a braking request from a driver; and a second operation of adjusting regenerative braking torque based on the amount of wheel-slippage, wherein the adjusting of the regenerative braking torque is performed through feedback control based on the amount of wheel-slippage, and includes reducing the regenerative braking torque to be less than the initial regenerative braking torque.

The regenerative braking torque may be a sum of a coasting regenerative braking torque and an allowable regenerative braking torque, the coasting regenerative braking torque may be configured to be a predetermined constant value, and the allowable regenerative braking torque may be determined through the feedback control.

The second operation may include detecting the amount of wheel-slippage of the rear wheel, and operating an electric brake-force distribution function in response that an amount of wheel-slippage of a rear wheel in the vehicle is greater than a first rear wheel reference value and less than a rear wheel limit reference value.

The second operation may include ending the adjusting of the regenerative braking torque when the regenerative braking torque adjusted through the feedback control is equalized to the initial regenerative braking torque.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
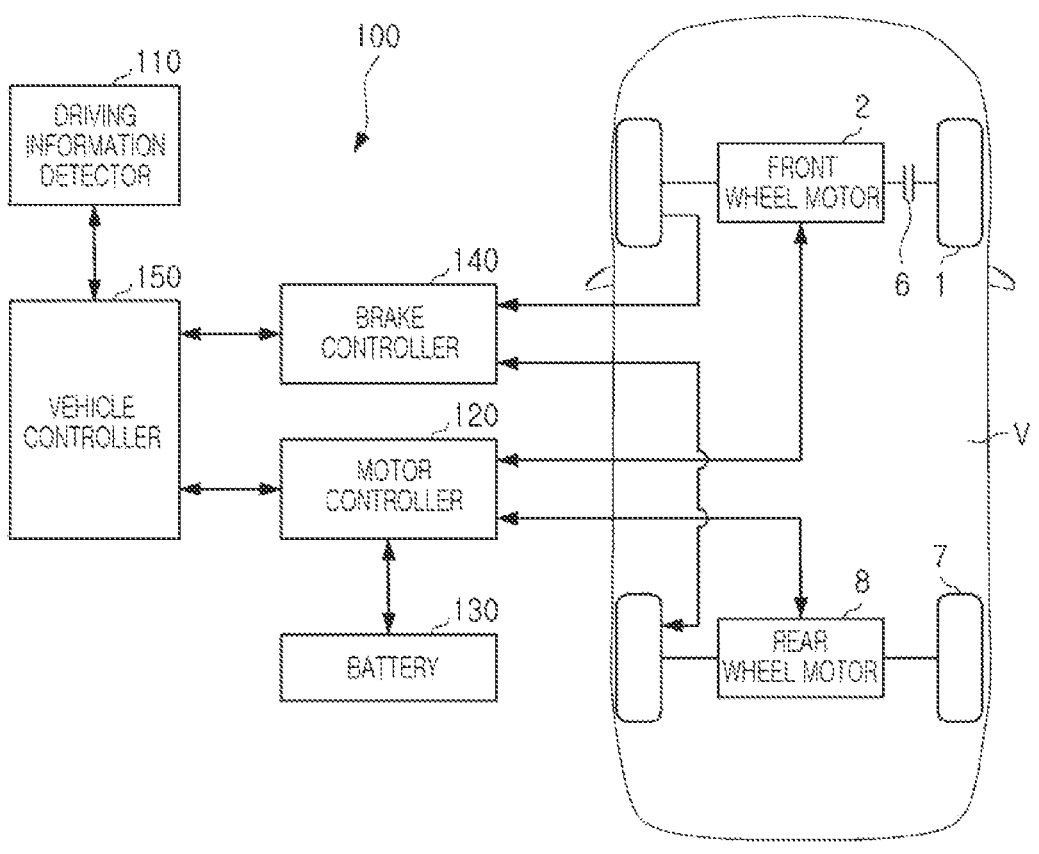
FIG. 1 is a diagram illustrating a vehicle including a braking control device according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described with reference to the appended drawings.

Various embodiments will be described with reference to accompanying drawings. However, this may not necessarily limit the scope of the embodiments to a specific embodiment form. Instead, modifications, equivalents and replacements included in the included concept and technical scope of the present description may be employed. Throughout the specification, similar reference numerals are used for similar elements.

FIG. 1 is a diagram illustrating a vehicle including a braking control device according to an exemplary embodiment of the present disclosure.

In an exemplary embodiment of the present disclosure, a vehicle V may be configured as a 4-wheel drive (4WD) electric vehicle including a front wheel motor 2 and a rear wheel motor 8 on a front wheel 1 and a rear wheel 7, respectively. The 4-wheel drive electric vehicle V may execute 2-wheel drive, which is driving using only one axis of the front wheel 1 and the rear wheel 7 and 4-wheel drive, which is driving using the entirety of axes of the front wheel 1 and the rear wheel 7, and 2-wheel drive and 4-wheel drive may be switched via a disconnector 6. The exemplary embodiment of the present disclosure may be applied to a 4WD vehicle in which the disconnector 6 is engaged all the time, but an exemplary embodiment thereof is not limited thereto.

The braking control device 100 may include a driving information detector 110, a motor controller 120, a battery 130, a brake controller 140 and a vehicle controller 150.

The driving information detector 110 may detect a driving state of the vehicle V and a braking request from a driver, and may transmit the information to the vehicle controller 150.

To the present end, the driving information detector 110 may include a sensor configured for detecting the amount of wheel-slippage, a sensor configured for detecting the speed of stepping on a brake pedal, a sensor configured for detecting a steering angle, a sensor configured for detecting wheel acceleration, a sensor configured for detecting a yaw rate, a sensor configured for detecting a motor speed, a sensor configured for detecting the speed of the vehicle V, and a sensor configured for detecting a position value of the brake pedal, and the like.

The motor controller 120 may be configured for controlling the driving and torque of the motor under control of the vehicle controller 150, and may store electricity generated by the motor in the battery 130 during regenerative braking. To the present end, the motor controller 120 may include at least one microprocessor, and at least one microprocessor may operate according to a program determined to execute a method of controlling the driving and torque of the motor.

The battery 130 may include a plurality of unit cells, may supply a driving voltage to a motor, and may be charged with a voltage generated by the motor during regenerative braking.

The brake controller 140 may be configured for controlling hydraulic braking (also referred to as "friction braking") supplied to the brake cylinders of each driving wheel under control of the vehicle controller 150. To the present end, the brake controller 140 may include at least one microprocessor, and at least one microprocessor may operate according to a program determined to execute a method of controlling hydraulic braking.

When a vehicle speed is greater than a predetermined vehicle speed Tv or a steering angle is greater than a predetermined steering angle Ta, the vehicle controller 150 may be configured for controlling the braking of vehicle V by determining a distribution ratio of regenerative braking torque of the front wheel motor 2 and regenerative braking torque of the rear wheel motor 8 differently, and may be configured for controlling the braking of vehicle V by determining a distribution ratio of hydraulic braking torque of the front wheel brake and hydraulic braking torque of the rear wheel brake differently. Here, if desired, the predetermined vehicle speed Tv or the predetermined steering angle Ta may be appropriately determined, and are not limited to specific values in an exemplary embodiment of the present disclosure.

When a braking request from a driver is detected, the vehicle controller 150 may be configured to determine a braking request torque according to a detected braking request, and may be configured for controlling braking of the vehicle V through the motor controller 120 and the brake controller 140 according to the determined braking request torque. Here, the braking request from a driver may be detected according to a position value of a brake pedal. The braking request torque may not be determined only by the position value of the brake pedal, and may be determined by the vehicle controller 150 based on information detected by the driving information detector 110. Because the method of determining the braking request torque is a well-known technique, a detailed description thereof will not be provided.

The vehicle controller 150 may be configured for controlling the braking torque by controlling the motor controller 120 and the brake controller 140 based on the braking request torque. Here, the braking torque may be the sum of regenerative braking torque and hydraulic braking torque. The term "initial regenerative braking torque" used below may refer to regenerative braking torque determined by a vehicle controller based on a braking request from a driver.

The vehicle controller 150 may be configured for controlling braking torque by determining regenerative braking torque and supplementing insufficient braking torque with hydraulic braking torque. However, under specific conditions, the braking torque may be controlled by determining the hydraulic braking torque and supplementing the insufficient braking torque with regenerative braking torque.

The regenerative braking torque may be the sum of the coasting regenerative braking torque and the allowable regenerative braking torque, and the coasting regenerative braking torque may be a predetermined value rather than a value changed by feedback control. Coasting regenerative braking torque may refer to regenerative braking torque formed by the front wheel motor 2 or the rear wheel motor 8 based on the case in which the vehicle V is in a coasting condition. The coasting regenerative braking torque may not change every moment by feedback control, and may be a predetermined value under specific conditions. The coasting regenerative braking torque may be zero depending on the driving condition and the state of the vehicle V.

The vehicle controller 150 may vary allowable regenerative braking torque. The vehicle controller 150 may adjust allowable regenerative braking torque through feedback control considering the amount of wheel-slippage of the front wheel 1 or the rear wheel 7.

When a braking request from a driver is detected, the vehicle controller 150 may operate an electric brake-force distribution (EBD) function. Accordingly, the vehicle controller 150 may be configured for controlling braking of the vehicle V by distributing hydraulic braking torque to the front wheel brakes and the rear wheel brakes. The vehicle controller 150 may operate an electric brake-force distribution (EBD) function regardless of whether regenerative stability control (RSC), which will be described later, is performed. That is, the vehicle controller 150 may operate an electric brake-force distribution (EBD) function for hydraulic braking independently of control of regenerative braking. That is, the vehicle controller 150 may operate the electric brake-force distribution (EBD) function while performing regenerative braking control for the motor.

The vehicle controller 150 may execute an anti-lock braking system (ABS) for the front wheel 1 or the rear wheel 7 in consideration of the amount of wheel-slippage of vehicle V.

Also, according to an exemplary embodiment of the present disclosure, when a vehicle speed is greater than a predetermined vehicle speed Tv or a steering angle is greater than a predetermined steering angle Ta, the vehicle controller 150 may be configured for controlling the braking of vehicle V by determining a distribution ratio of the regenerative braking torque of the front the wheel motor 2 and the regenerative braking torque of the rear wheel motor 8 differently, and may be configured for controlling the braking of vehicle V by determining a distribution ratio of the hydraulic braking torque of the front wheel brake and the hydraulic braking torque of the rear wheel brake differently. Here, if desired, the predetermined vehicle speed Tv or the predetermined steering angle Ta may be appropriately determined, and are not limited to specific values in an exemplary embodiment of the present disclosure.

The vehicle controller 150 may perform regenerative stability control (RSC) when braking and wheel-slippage deviate from a reference value. Regenerative stability control (RSC) may be a technique of securing braking stability by disengaging regenerative braking when wheel-slippage is within the standard range based on wheel-slippage. When regenerative braking is released by regenerative stability control (RSC), motor torque may be adjusted negatively for slipping control. When regenerative braking is released by regenerative stability control, braking may be performed by hydraulic braking.

The vehicle controller 150 may adjust the regenerative braking torque of the front wheel 1 or the rear wheel 7 in consideration of the amount of wheel-slippage of the vehicle V. The vehicle controller 150 may adjust the regenerative braking torque by changing the allowable regenerative braking torque. The vehicle controller 150 may adjust allowable regenerative braking torque through feedback control based on the amount of wheel-slippage. Also, if desired, the vehicle controller 150 may adjust the regenerative braking torque by adjusting the coasting regenerative braking torque to be 0 and adjusting the allowable regenerative braking torque.

The regenerative braking torque may be adjusted according to frictional force acting on the wheel. That is, when frictional force of the road surface acting on the wheel is relatively high, wheel-slippage may be difficult to occur such that the vehicle controller 150 may increase the regenerative braking torque, and conversely, when the frictional force of the road surface acting on the wheel decreases, wheel-slippage may be likely to occur such that the vehicle controller 150 may reduce regenerative braking torque. When wheel-slippage occurs, it may be indicated that the frictional force of the road surface acting on the wheel may be less than when wheel-slippage does not occur.

The regenerative braking torque determined before wheel-slippage occurs may be greater than the allowable regenerative braking torque determined in a circumstance in which wheel-slippage occurs.

When wheel-slippage occurs and regenerative braking torque is reduced, the difference between the speed of vehicle V and the speed of the wheel may decrease and the vehicle may escape the wheel-slippage circumstance. Furthermore, when wheel-slippage occurs, the regenerative stability control (RSC) may intervene such that the regenerative braking torque may not become 0, as in general cases such that regenerative braking may be performed even in the wheel-slippage circumstance, and accordingly, high fuel efficiency of the vehicle V may be obtained, which may be advantageous.

In an exemplary embodiment of the present disclosure, each of the battery controller 140, the motor controller 120 and the vehicle controller 150 may be a processor (e.g., computer, microprocessor, CPU, ASIC, circuitry, logic circuits, etc.). Each of the battery controller 140, the motor controller 120 and the vehicle controller 150 may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Alternatively, the battery controller 140, the motor controller 120 and the vehicle controller 150 may be integrated in a single processor.

Figure 2:
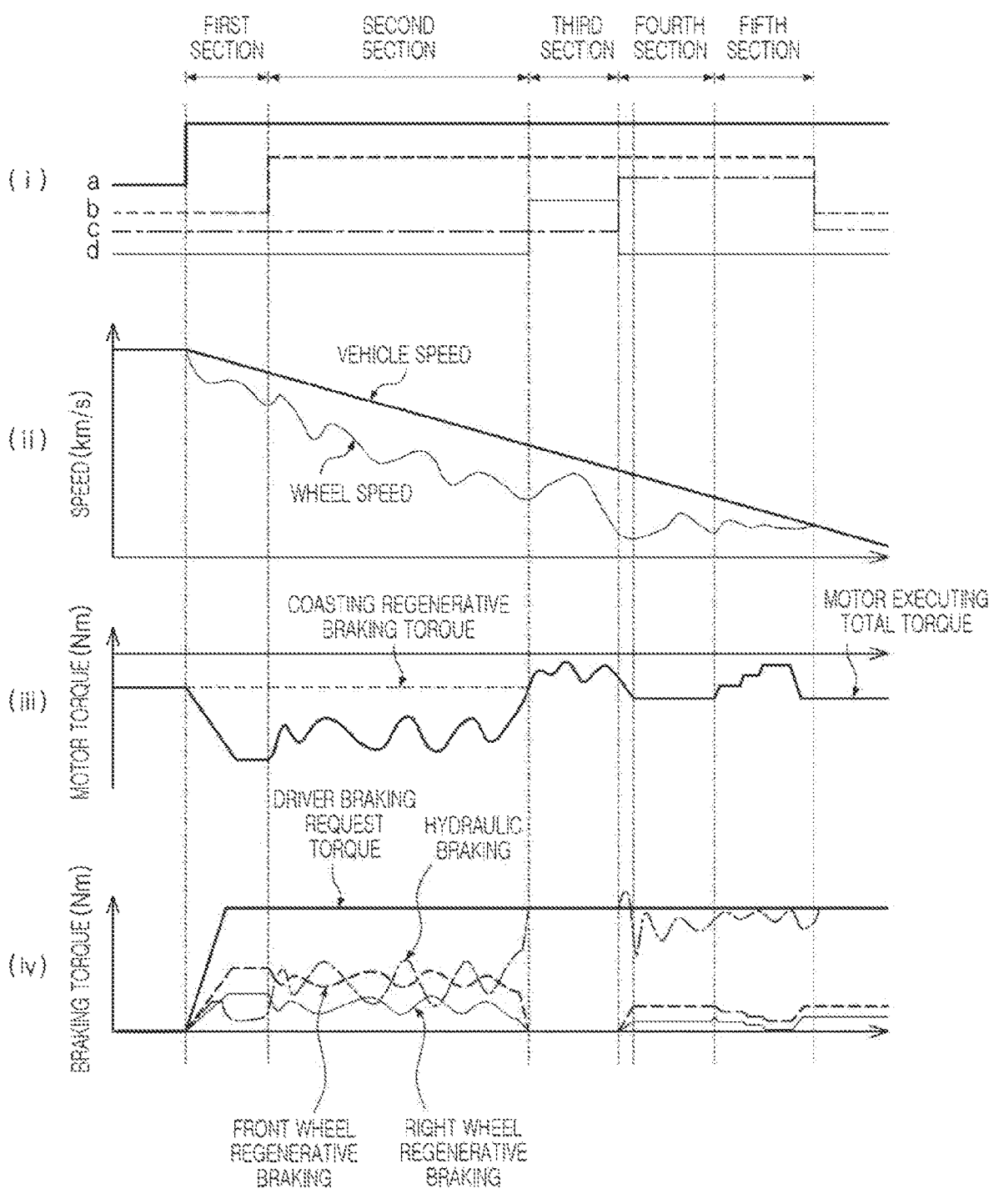
FIG. 2 is a graph illustrating changes in braking motor torque and braking torque during braking according to an exemplary embodiment of the present disclosure.

FIG. 2 is a graph illustrating changes in braking motor torque and braking torque during braking according to an exemplary embodiment of the present disclosure. Regenerative braking torque control will be described based on embodiments with reference to FIG. 2. The graph in FIG. 2 is arbitrarily drawn for description and does not indicate that the sections illustrated in the graph in FIG. 2 are executed in sequence.

The graph (i) in FIG. 2, the a-line may refer to a braking request from a driver. There may be a braking request from a driver in the first section and the entirety of the sections after the first section. The b-line may refer to the adjustment of regenerative braking torque. In the second section to fifth section, the vehicle controller 150 may be configured for controlling regenerative braking torque. The c-line may indicate whether an anti-lock braking system may be involved. The anti-lock braking system may be involved in the fourth section and fifth section. The d-line may indicate whether regenerative stability control may be involved. In the third section, regenerative stability control may be involved.

The graph (ii) in FIG. 2 illustrates a difference between the speed of the vehicle and the rotation speed of the wheel.

The graph (iii) in FIG. 2 illustrates a change in motor torque during braking according to a braking request from a driver. The total torque executed by the motor may include regenerative braking torque and torque for slipping control.

The graph (iv) in FIG. 2 illustrates a braking request torque from a driver, the regenerative braking torque of the front wheel or rear wheel, and the hydraulic braking torque. The braking request from a driver torque may be determined by considering a brake pedal operation, and the sum of regenerative braking torque and hydraulic braking torque may not necessarily amount to hydraulic braking torque.

(1) First Section

The first section may be a condition in which there is a braking request from a driver, and regenerative stability control and an anti-lock braking system may not intervene.

Also, wheel-slippage due to the difference between the vehicle speed and the wheel speed may be less than the first reference value.

The first reference value may be determined in consideration of the output, weight, speed, a steering angle of the front wheel, friction coefficient of the tire of the vehicle.

In response to the braking request from a driver, the vehicle controller 150 may be configured for controlling braking torque. In the instant case, the vehicle controller 150 may be configured to determine braking torque according to predetermined conditions or determination methods. The vehicle controller 150 may be configured to determine regenerative braking torque and may be configured to determine braking torque by supplementing insufficient braking torque with hydraulic braking.

(2) Second Section

The second section may be a condition in which there is a braking request from a driver and regenerative stability control and anti-lock braking system may not be executed. The vehicle controller 150 may be configured for controlling regenerative braking torque of the front wheel or the rear wheel through feedback control in consideration of wheel-slippage of the front wheel or the rear wheel. Since wheel-slippage occurs, the vehicle controller 150 may stabilize the behavior of vehicle V by reducing braking torque. The vehicle controller 150 may change the driving regenerative braking torque by maintaining the coasting regenerative braking torque and adjusting the allowable regenerative braking torque. The vehicle controller 150 may reduce the regenerative braking torque to be less than the initial regenerative braking torque by reducing the allowable regenerative braking torque. The vehicle controller 150 may be configured for controlling the braking torque by changing the hydraulic braking torque based on the regenerative braking torque determined by feedback control.

Under the condition of the present section, the vehicle controller 150 may operate an electric brake-force distribution (EBD) function for the hydraulic brake together with regenerative braking torque control for the front wheel motor 2 or the rear wheel motor 8. When wheel-slippage occurs and the regenerative braking torque decreases further than the initial regenerative braking torque, the difference between the speed of the vehicle V and the speed of the wheel may decrease, and the vehicle may escape the wheel-slippage circumstance. Furthermore, when wheel-slippage occurs, the regenerative stability control (RSC) may intervene such that the regenerative braking torque may not become 0 as in general cases. Thus, regenerative braking may be performed even in the wheel-slippage circumstance, and accordingly, high fuel efficiency of the vehicle V may be obtained, which may be advantageous.

(3) Third Section

The third section may be a condition in which there may be a braking request from a driver and regenerative stability control may be executed. The third section may be a region in which the wheel-slippage reference value may be greater than that of the second section. Accordingly, the third section may be more unstable than the second section.

When the behavior of vehicle V becomes unstable, the vehicle controller 150 may release regenerative braking. The vehicle controller 150 may be configured to generate braking torque using hydraulic braking torque. The vehicle controller 150 may adjust the torque of the motor in a range between coasting regenerative braking torque and 0, perform control to escape from wheel-slippage. Under the conditions of the present section, the vehicle controller 150 may operate the electric brake-force distribution (EBD) function for the hydraulic brake together with the regenerative braking torque control for the front wheel motor 2 or the rear wheel motor 8.

(4) Fourth Section

The fourth section may be a condition in which there may be a braking request from a driver and an anti-lock braking system (ABS) may be executed. The fourth section may be a region in which the wheel-slippage reference value may be greater than that of the third section. Accordingly, the fourth section may be in a more unstable state than the third section.

In the fourth section, the vehicle controller 150 may adjust regenerative braking torque using only allowable regenerative braking torque, excluding coasting regenerative braking torque. The allowable regenerative braking torque may be adjusted to be a predetermined value. In the instant case, the predetermined value may be a constant value. In the instant case, the predetermined constant value may be predetermined in consideration of conditions such as weight, engine output, an engine torque, and tire friction coefficient of the vehicle. Under the conditions of the present section, the vehicle controller 150 may operate the electric brake-force distribution (EBD) function together.

(5) Fifth Section

The fifth section may be a condition in which there may be a braking request from a driver and an anti-lock braking system (ABS) may be executed. Also, the behavior of vehicle V may be relatively unstable in a state in which an anti-lock braking system (ABS) is executed. The fifth section may be a region in which the wheel-slippage reference value may be greater than that of the fourth section. Accordingly, the fifth section may be more unstable than the fourth section.

In the fifth section, the vehicle controller 150 may be configured to determine the regenerative braking torque using only the allowable regenerative braking torque, excluding the coasting regenerative braking torque value. In the instant case, the allowable regenerative braking torque may be adjusted to a predetermined value as illustrated in the fifth section of the graph in graph (iv) in FIG. 2. The predetermined value may be a value that changes based on the amount of wheel-slippage. The predetermined value may change based on the amount of wheel-slippage. The predetermined value may gradually decrease. The predetermined value may gradually decrease with regular time intervals. The regular time interval may be a predetermined time interval. The vehicle controller 150 may detect the amount of wheel-slippage even when the anti-lock braking system (ABS) is executed, and the vehicle controller 150 may gradually reduce the regenerative braking torque to a predetermined value until the amount of wheel-slippage detected is a condition in which the intervention of the anti-lock braking system is disengaged. Under the conditions of the present section, the vehicle controller 150 may be configured for controlling the braking torque in a manner in which the hydraulic braking torque is first determined and the regenerative braking torque is determined.

(6) Regenerative Braking by Braking Request

When the braking circumstance of the above-described second section to fifth section conditions is escaped and the behavior of vehicle V is stabilized, the vehicle controller 150 may perform regenerative braking by braking request.

(7) Inhibition of Regenerative Braking

Under specific conditions, regenerative braking may be inhibited. The conditions of the regenerative braking prohibition may include, for example, gear condition, VDC (Vehicle Dynamic Control) intervention, TCS (Traction Control System) intervention, ESC (Electronic Stability Control) intervention, and the amount of wheel-slippage exceeding the limit reference value. Even in cases other than the above example, when the predetermined regenerative braking prohibition condition is met, the regenerative braking prohibition condition may take precedence and the regenerative braking may be disengaged.

Figure 3:
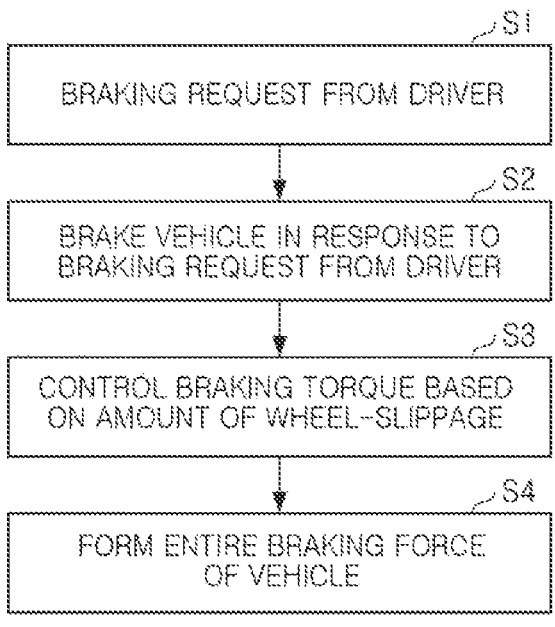
FIG. 3 is a flowchart illustrating a method of controlling braking force of a vehicle according to an exemplary embodiment of the present disclosure.

FIG. 3 is a flowchart illustrating a method of controlling braking force of a vehicle according to an exemplary embodiment of the present disclosure. Hereinafter, the reference value may be a determining value which may vary depending on the weight of vehicle V, engine power, tire friction coefficient, and brake capacity, and may not be determined by a specific determination method or specific standard.

A braking control method of a vehicle will be described with reference to FIG. 3.

In the braking request from a driver operation S1, the vehicle controller 150 may detect the braking request from a driver. The braking request from a driver may be made by operating the brake pedal. The braking request from a driver may be based on the operation of the accelerator pedal, but when the driver makes a braking request by manipulating the accelerator pedal, the regenerative braking torque may be determined by the coasting regenerative braking torque, excluding the allowable regenerative braking torque. Accordingly, in operation S1, the braking request from a driver may refer to a request by operating the brake pedal.

In the vehicle braking operation S2 according to the braking request from a driver, the vehicle controller 150 may be configured to determine the braking torque in response to the braking request from a driver. The braking torque may be determined by regenerative braking torque and hydraulic braking torque. The vehicle controller 150 may first determine a regenerative braking torque, and may be configured to determine a hydraulic braking torque in consideration of insufficient braking torque. However, under specific conditions, the hydraulic braking torque may be determined first and the regenerative braking torque may be determined. The vehicle controller 150 may perform braking the vehicle with the determined braking torque.

In operation S3 for controlling the regenerative braking torque based on the amount of wheel-slippage, the vehicle controller 150 may detect the amount of wheel-slippage through the difference between the vehicle speed and the wheel speed, and may be configured for controlling the regenerative braking torque based on the detected amount of wheel-slippage. A detailed description of S3 operation will be described later.

In operation S4 for forming the total braking force of the vehicle, the vehicle controller 150 may form the entire braking force of the vehicle using the regenerative braking torque determined in operation S3 and the hydraulic braking torque.

Figure 4:
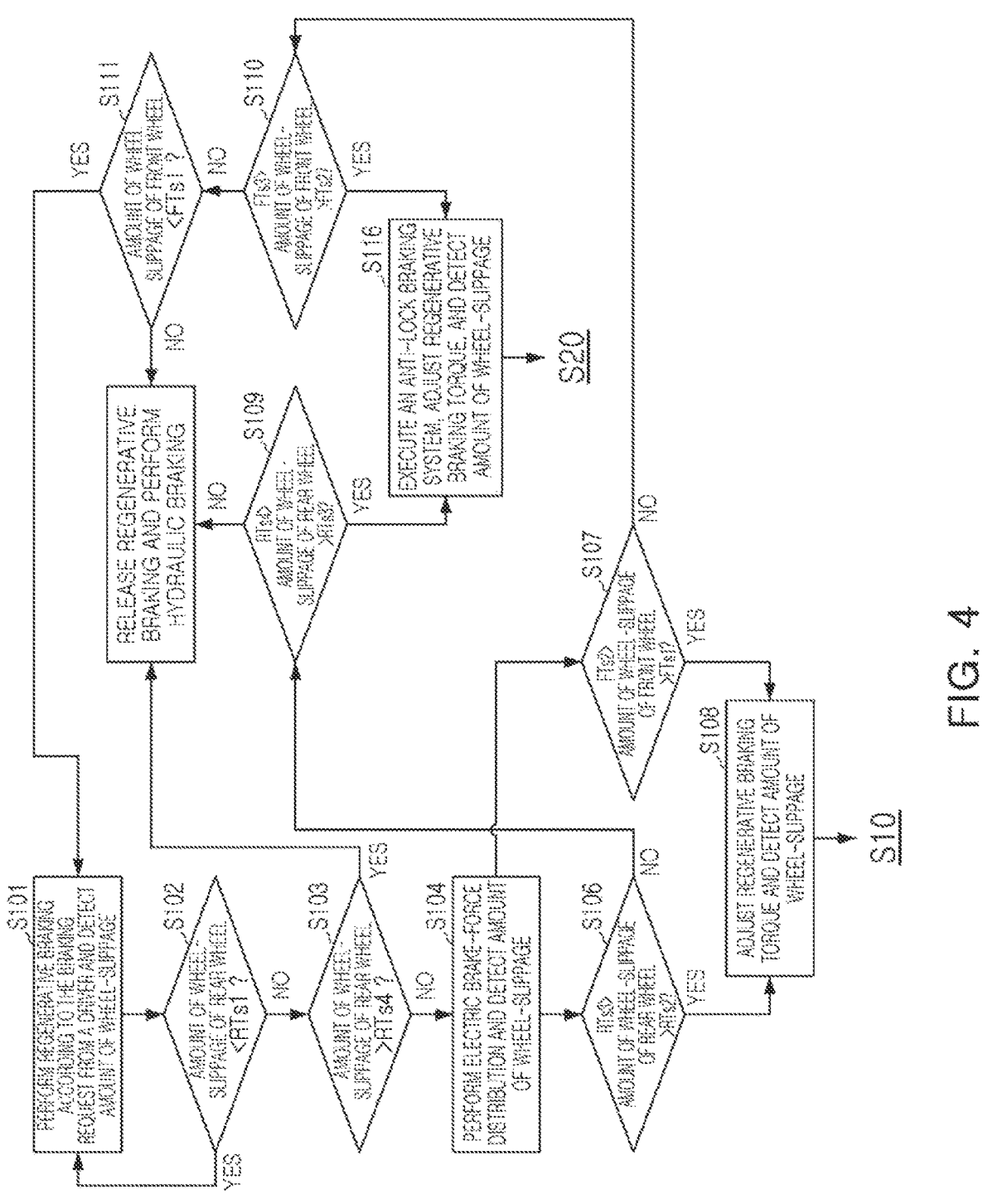
FIG. 4, FIG. 5 and FIG. 6 are flowcharts illustrating a method of controlling regenerative braking torque according to an exemplary embodiment of the present disclosure.
Figure 5:
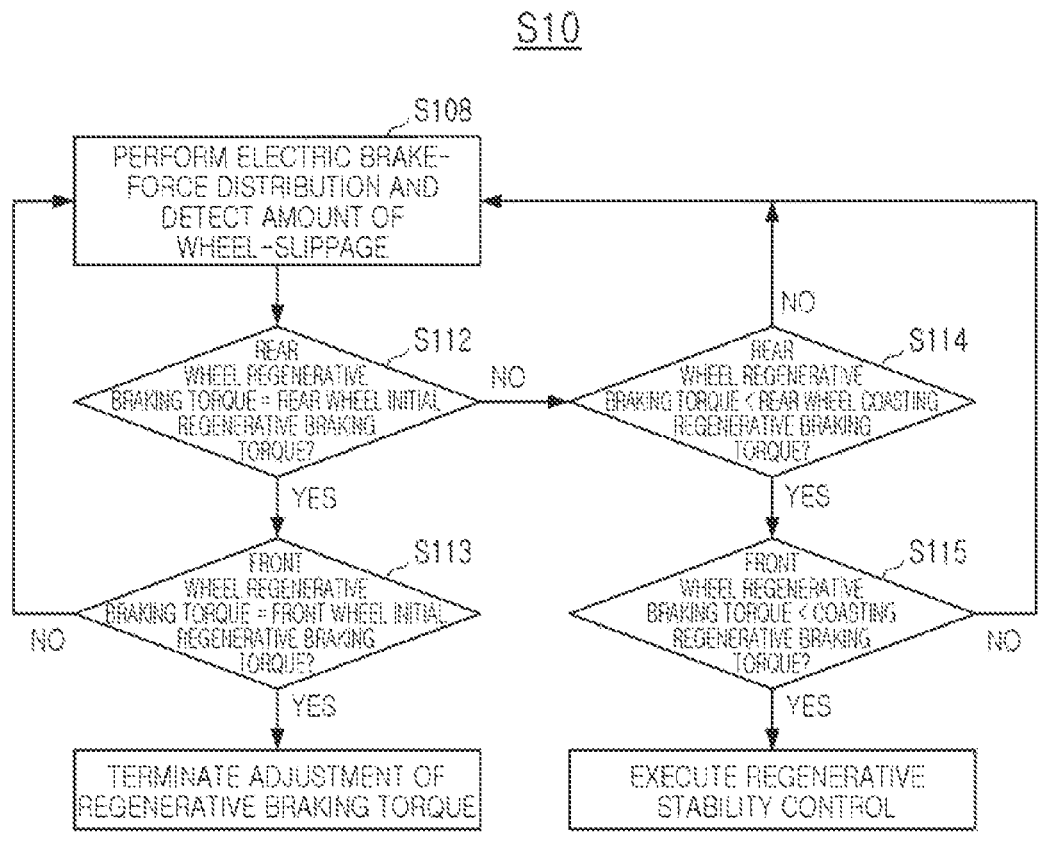
Figure 6:
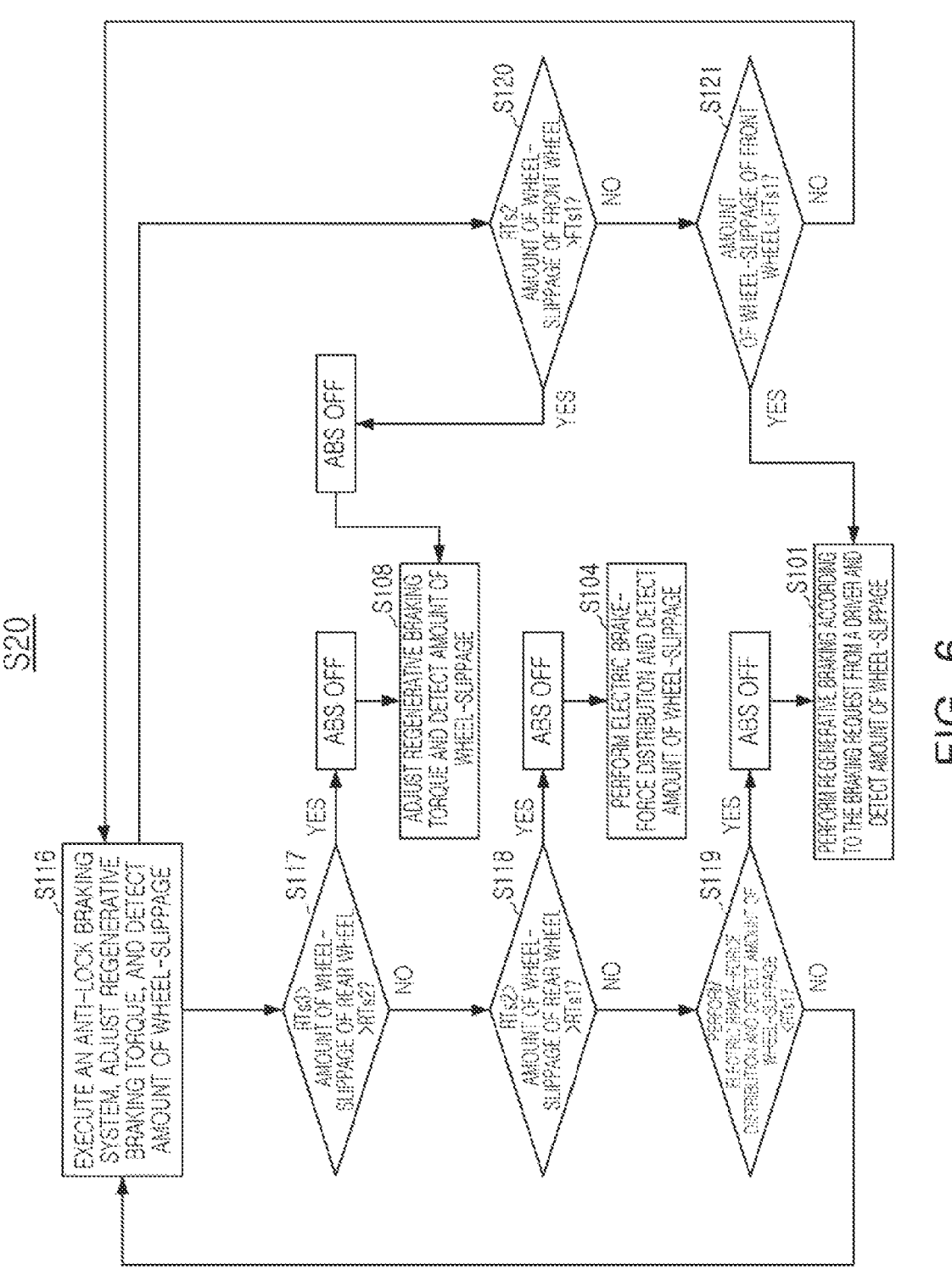

Hereinafter, S3 operation will be described in greater detail with reference to FIGS. 4, 5 and 6. FIGS. 4, 5 and 6 are flowcharts illustrating a method of controlling regenerative braking torque according to an exemplary embodiment of the present disclosure.

FIG. 4 illustrates a process in which regenerative braking is performed by a braking request and regenerative braking torque may be adjusted according to the amount of wheel-slippage, and also illustrates a process in which regenerative braking is performed by a braking request and regenerative braking is adjusted under conditions in which the anti-lock braking system intervenes according to the amount of wheel-slippage.

In operation S101, the vehicle controller 150 may perform regenerative braking according to the braking request from a driver. Also, the vehicle controller 150 may detect the amount of wheel-slippage, and the detected amount of wheel-slippage may be an amount of wheel-slippage of a front wheel or a rear wheel. The amount of wheel-slippage detected in the present operation may be referred to as first amount of wheel-slippage.

In operation S102, the vehicle controller 150 may be configured to determine whether the first amount of wheel-slippage of the rear wheel is less than a first reference value RTs1 of the rear wheel. If satisfied, operation S101 may be performed such that the vehicle controller 150 may perform regenerative braking according to the braking request. If not satisfied, the vehicle controller 150 may be configured to determine operation S103.

In operation S103, the vehicle controller 150 may be configured to determine whether the first amount of wheel-slippage of the rear wheel is greater than a limit reference value RTs4 of the rear wheel. If the amount of wheel-slippage is greater than the limit reference value RTs4, the condition may be a condition in which regenerative braking may not be performed due to excessive wheel-slippage. If satisfied, regenerative braking may be released and hydraulic braking may be performed. If not satisfied, operation S104 may be performed.

In operation S104, the vehicle controller 150 may operate an electric brake-force distribution function. Also, the vehicle controller 150 may detect the amount of wheel-slippage, and the detected amount of wheel-slippage may be the amount of wheel-slippage of the front wheel or the rear wheel. The amount of wheel-slippage detected in the present operation may be referred to as the second amount of wheel-slippage.

In operation S106, the vehicle controller 150 may be configured to determine whether the second amount of wheel-slippage of the rear wheel is greater than a second reference value RTs2 of the rear wheel and less than a third reference value RTs3 of the rear wheel. If satisfied, the vehicle controller 150 may perform operation S108. If not satisfied, the vehicle controller 150 may be configured to determine operation S109.

In operation S107, the vehicle controller 150 may be configured to determine whether the amount of wheel-slippage of the front wheel second is greater than a first reference value FTs1 and less than a second reference value FTs1 of the front wheel. If satisfied, the vehicle controller 150 may is configured to perform operation S108. If not satisfied, the vehicle controller 150 may be configured to determine S110 operation.

In operation S108, the vehicle controller 150 may be configured for controlling regenerative braking torque. In the present operation, the adjustment of regenerative braking torque may be performed based on the control method in the second section described above. Also, the vehicle controller 150 may detect the amount of wheel-slippage, and the detected amount of wheel-slippage may be the amount of wheel-slippage of the front wheel or the rear wheel. The amount of wheel-slippage detected in the present operation may be referred to as the third amount of wheel-slippage. The operation S108 will be described in greater detail through operation S10 in FIG. 5.

In operation S109, the vehicle controller 150 may be configured to determine whether the second amount of wheel-slippage of the rear wheel is greater than a third reference value TRs3 and less than a rear wheel limit reference value RTs4 of the rear wheel. If satisfied, the vehicle controller 150 may is configured to perform operation S116. If not satisfied, the vehicle controller may release regenerative braking and may perform braking the vehicle with hydraulic braking.

In operation S107, the vehicle controller 150 may be configured to determine whether the second amount of wheel-slippage of the front wheel is greater than a first reference value FTs1 and less than a second front wheel reference value of the front wheel. If satisfied, the vehicle controller 150 may perform operation S108. If not satisfied, the vehicle controller 150 may be configured to determine operation S110.

In operation S110, the vehicle controller 150 may be configured to determine whether the second amount of wheel-slippage of the front wheel is greater than a second reference value FTs2 and less than a front wheel third reference value FTs3 of the front wheel. If satisfied, the vehicle controller 150 may perform operation S116. If not satisfied, the vehicle controller 150 may be configured to determine operation S11.

In operation S111, the vehicle controller 150 may be configured to determine whether the second amount of wheel-slippage of the front wheel is less than a first reference value FTs1 of the front wheel. If satisfied, the vehicle controller 150 may perform operation S101. If not satisfied, the vehicle controller 150 may release regenerative braking and may brake the vehicle with hydraulic braking.

FIG. 5 illustrates a process in which regenerative braking torque is adjusted and regenerative braking torque control is terminated. FIG. 5 also illustrates a process in which regenerative braking torque is adjusted and regenerative stability control intervenes.

In operation S108, the vehicle controller 150 may be configured for controlling regenerative braking torque. In the present operation, the adjustment of regenerative braking torque may be based on the control method in the second section described above. Also, the vehicle controller 150 may detect the amount of wheel-slippage, and the detected amount of wheel-slippage may be the amount of wheel-slippage of the front wheel or the rear wheel. The amount of wheel-slippage detected in the present operation may be referred to as third amount of wheel-slippage.

In operation S112, the vehicle controller 150 may be configured to determine whether the rear wheel regenerative braking torque determined by feedback control falls within a determined range of the rear wheel initial regenerative braking torque based on wheel-slippage. Here, the determined range may be within a specific range before and after with respect to the initial regenerative braking torque. If satisfied, the vehicle controller 150 may be configured to determine operation S113. If not satisfied, the vehicle controller 150 may be configured to determine operation S114.

In operation S113, the vehicle controller 150 may be configured to determine whether the front wheel regenerative braking torque determined by feedback control falls within a determined range of the front wheel initial regenerative braking torque based on wheel-slippage. Here, the determined range may be within a specific range before and after with respect to the initial regenerative braking torque. If satisfied, since the amount of wheel-slippage of the vehicle is within a stable range, the vehicle controller 150 may terminate the adjustment of regenerative braking torque. If not satisfied, the vehicle controller 150 may perform operation S108.

In operation S114, the vehicle controller 150 may be configured to determine whether the rear wheel regenerative braking torque determined by feedback control is less than the rear wheel coasting regenerative braking torque based on wheel-slippage. If satisfied, the vehicle controller 150 may be configured to determine operation S115. If not satisfied, the vehicle controller 150 may perform operation S108 again.

In operation S115, the vehicle controller 150 may be configured to determine whether front wheel regenerative braking torque determined by feedback control is less than front wheel coasting regenerative braking torque based on wheel-slippage. If satisfied, the vehicle controller 150 may execute regenerative stability control. Accordingly, in the instant case, the adjustment of regenerative braking torque may be based on the control method in the third section described above. If not satisfied, the vehicle controller 150 may perform operation S108 again.

FIG. 6 illustrates a process of performing regenerative braking by braking request while an anti-lock braking system is executed and regenerative braking torque is adjusted.

In operation S116, the vehicle controller 150 may execute an anti-lock braking system. Also, the vehicle controller 150 may adjust regenerative braking torque. Accordingly, in the instant case, the adjustment of regenerative braking torque may be based on the control method in the fourth section or fifth section described above. Also, the vehicle controller 150 may detect the amount of wheel-slippage. The amount of wheel-slippage detected in the present operation may be referred to as fourth amount of wheel-slippage.

In operation S117, the vehicle controller 150 may be configured to determine whether the fourth amount of wheel-slippage of the rear wheel is greater than a second reference value RTs2 and less than a third rear wheel reference value RTs3 of the rear wheel. If satisfied, the condition may be a condition in which the amount of the wheel-slippage of the rear wheel is changed to be within a relatively stable range and the anti-lock braking system may not need to be executed such that the vehicle controller 150 may terminate the anti-lock braking system (ABS) and may perform operation S108. Accordingly, the vehicle controller 150 may adjust regenerative braking torque and may detect the amount of wheel-slippage. If not satisfied, the vehicle controller 150 may be configured to determine operation S118.

In operation S118, the vehicle controller 150 may be configured to determine whether the fourth amount of wheel-slippage of the rear wheel is greater than a first reference value RTs1 and less than a second rear wheel reference value RTs2 of the rear wheel. If satisfied, the condition may be a condition in which the amount of the wheel-slippage of the rear wheel is changed to be within a relatively stable range and the anti-lock braking system may not need to be executed such that the vehicle controller 150 may terminate the anti-lock braking system, and may perform operation S104. Accordingly, the vehicle controller 150 may stop adjusting regenerative braking torque and may perform regenerative braking according to the braking request from a driver. Also, the vehicle controller 150 may activate the electric brake-force distribution function. If not satisfied, the vehicle controller 150 may be configured to determine operation S119.

In operation S119, the vehicle controller 150 may be configured to determine whether the fourth amount of wheel-slippage of the rear wheel is less than a first reference value RTs1 of the rear wheel. If satisfied, the condition may be a condition in which the amount of the wheel-slippage of the rear wheel is changed to be within a relatively stable range, and the anti-lock braking system may not need to be executed such that the vehicle controller 150 may terminate the anti-lock braking system and may perform operation S101. Accordingly, the vehicle controller 150 may not perform wheel-slippage control and may perform regenerative braking by the braking request without. Also, the vehicle controller 150 may detect the amount of wheel-slippage. If not satisfied, the vehicle controller 150 may be configured to determine operation S116.

In operation S120, the vehicle controller 150 may be configured to determine whether the fourth amount of wheel-slippage of the front wheel is greater than a first front wheel reference value FTs1 and less than a second front wheel reference value RTs2. If satisfied, the condition may be a condition in which the amount of wheel-slippage of the front wheel is changed within a relatively stable range and the anti-lock braking system may not need to be executed such that the vehicle controller 150 may terminate the anti-lock braking system and may perform operation S108. Accordingly, the vehicle controller 150 may adjust the regenerative braking torque and may detect the amount of wheel-slippage. If not satisfied, the vehicle controller 150 may be configured to determine operation S121.

In operation S121, the vehicle controller 150 may be configured to determine whether the fourth amount of wheel-slippage of the front wheel is less than a first reference value FTs1 of the front wheel. If satisfied, the condition may be a condition in which the amount of wheel-slippage of the front wheel changes to be within a relatively stable range and the anti-lock braking system may not need to be executed such that the vehicle controller 150 may terminate the anti-lock braking system and may perform operation S101. Accordingly, the vehicle controller 150 may perform regenerative braking according to the braking request from a driver and may detect the amount of wheel-slippage. If not satisfied, the vehicle controller 150 may be configured to determine operation S116.

Figure 7:
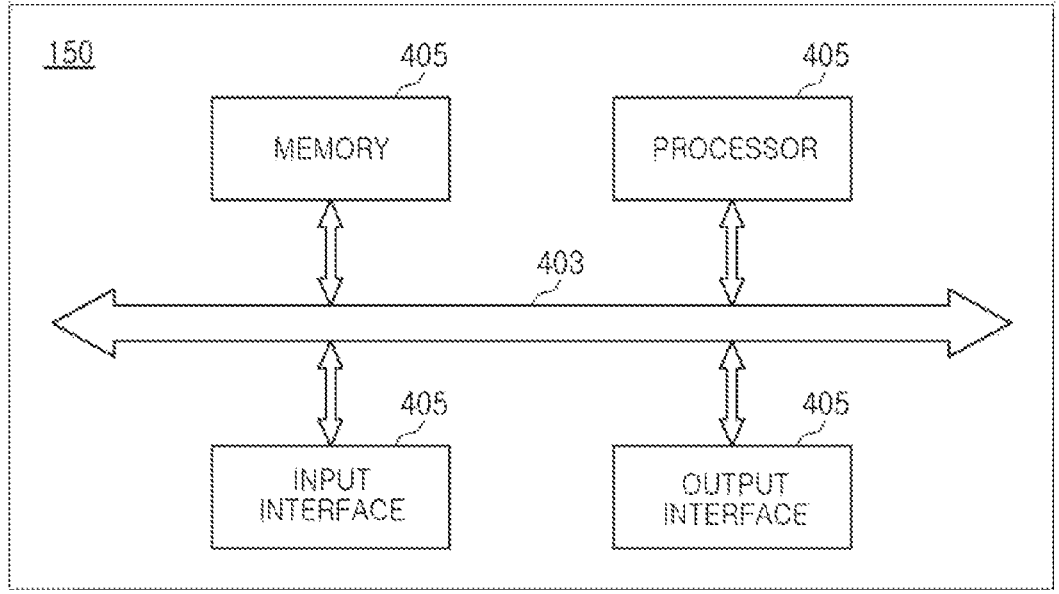
FIG. 7 is a block diagram illustrating a vehicle controller according to an exemplary embodiment of the present disclosure, applicable to the vehicle controller illustrated in FIG. 1.

FIG. 7 is a block diagram illustrating a vehicle controller according to an exemplary embodiment of the present disclosure, applicable to the vehicle controller illustrated in FIG. 1.

As illustrated in FIG. 7, the vehicle controller 150 may include an input interface 401, an output interface 402, a processor 404 and memory 405, and the input interface 401, the output interface 402, the processor 404 and the memory 405 may be interconnected through a system bus 403.

In the exemplary embodiment of the present disclosure, the memory 405 may be used to store programs, instructions or codes, and the processor 404 may execute the program, instruction or code stored in the memory 405, may be configured for controlling the input interface 401 to receive a signal, and may transmit a signal by controlling the output interface 402. The aforementioned memory 405 may include a read-only memory and random access memory, and may provide instructions and data to the processor 404.

In an exemplary embodiment of the present disclosure, the processor 404 may be implemented as a central processing unit (CPU), or may be another general purpose processor, a digital signal processor (DSP), an application specific integrated circuit (ASIC), a field programmable gate array (FPGA) or other programmable logic device, a discrete gate or transistor logic device, a discrete hardware component, or the like. The general-purpose processor may be implemented as a microprocessor, or the processor may be a general processor. The aforementioned processor 404 may perform the aforementioned operations of the vehicle controller.

In an exemplary embodiment of the present disclosure, the method in FIG. 3 may be implemented by an integrated logic circuit of hardware in the processor 404 or an instruction in a form of software. The description of the method included in relation to the exemplary embodiment of the present disclosure may be implemented to be performed and completed by a hardware processor, or to be performed and completed by a combination of hardware and software modules of the processor. A software module may be disposed in a storage medium such as random access memory, flash memory, read-only memory, programmable read-only memory or electrically erasable programmable memory, registers, or the like. The corresponding storage medium may be disposed in the memory 405, and the processor 404 may read out the information of the memory 405 and may combines the information with hardware to implement the above method. To avoid overlapping descriptions, detailed descriptions thereof will not be provided.

According to the aforementioned embodiments, even in a circumstance in which wheel-slippage occurs, high braking force may be obtained using regenerative braking.

Also, since regenerative braking may be maintained as much as possible before changing to a state in which only hydraulic braking is used, a sense of heterogeneity which a driver may feel in a circumstance in which only hydraulic braking is used may be reduced.

Also, even in a circumstance in which wheel-slippage occurs, by increasing the use of regenerative braking, high fuel efficiency may be obtained.

Also, without changing the hydraulic brake of the braking device to a hydraulic brake including a large thermal mass, braking performance of the braking device may be increased, which may be advantageous.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper". "lower", "inner" "outer", "up", "down", "upwards", "downwards", "front", "rear", "back", "inside", "outside", "inwardly". "outwardly". "interior", "exterior", "internal". "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A braking control apparatus, comprising:
   a driving information detector configured to detect a braking request from a driver while a vehicle is driving; and a vehicle controller configured to control a braking torque of the vehicle in response to the braking request from the driver, wherein the braking torque includes a regenerative braking torque formed by a motor and a hydraulic braking torque formed by a hydraulic brake, wherein the vehicle controller is further configured to perform regenerative braking using an initial regenerative braking torque determined by the braking request from the driver, and in response that wheel-slippage occurs, the vehicle controller is further configured to reduce the regenerative braking torque to be less than the initial regenerative braking torque, wherein the vehicle controller compares the wheel-slippage of a rear wheel in the vehicle with a first rear wheel reference value, a second rear wheel reference value, a third rear wheel reference value, and a rear wheel limit reference value, wherein the first, second, and third rear wheel reference values and the rear wheel limit reference value have progressively increasing wheel-slippage reference values, and wherein the vehicle controller is further configured to operate an electric brake-force distribution function for hydraulic braking in response that an amount of the wheel-slippage of the rear wheel in the vehicle is greater than the first rear wheel reference value and less than the rear wheel limit reference value.

2. The braking control apparatus of claim 1, wherein the regenerative braking torque is a sum of a predetermined coasting regenerative braking torque and an allowable regenerative braking torque, and wherein the vehicle controller is further configured to reduce the regenerative braking torque to be less than the initial regenerative braking torque by reducing the allowable regenerative braking torque.

3. The braking control apparatus of claim 1, wherein, in response that the amount of the wheel-slippage of the rear wheel is greater than the second rear wheel reference value and less than the third rear wheel reference value, the vehicle controller is further configured to reduce regenerative braking torque of the rear wheel to be less than initial regenerative braking torque of the rear wheel.

4. The braking control apparatus of claim 3, wherein, in response that an amount of wheel-slippage of a front wheel in the vehicle is greater than a first front wheel reference value and less than a second front wheel reference value, the vehicle controller is further configured to reduce a regenerative braking torque of the front wheel to be less than an initial regenerative braking torque of the front wheel.

5. The braking control apparatus of claim 1, wherein the vehicle controller is further configured to determine the regenerative braking torque by feedback control according to the amount of the wheel-slippage in response that the wheel-slippage occurs.

6. The braking control apparatus of claim 5, wherein the vehicle controller is further configured to release regenerative braking in response that the regenerative braking torque determined by the feedback control is less than a predetermined coasting regenerative braking torque.

7. The braking control apparatus of claim 5, wherein, in response that the regenerative braking torque determined by the feedback control is within a determined range of the initial regenerative braking torque, the vehicle controller is further configured to terminate the feedback control.

8. The braking control apparatus of claim 7, wherein the regenerative braking torque is at least one of a front wheel regenerative braking torque and a rear wheel regenerative braking torque.

9. The braking control apparatus of claim 1, wherein, in response that an amount of wheel-slippage of the rear wheel in the vehicle is greater than the third rear wheel reference value and less than the rear wheel limit reference value, the vehicle controller is further configured to operate an anti-lock braking system.

10. The braking control apparatus of claim 9, wherein, in response that the anti-lock braking system operates, the vehicle controller is further configured to adjust the regenerative braking torque to be a predetermined value.

11. A braking control method of a vehicle, the method comprising:

performing, by a vehicle controller, a regenerative braking using an initial regenerative braking torque according to a braking request from a driver; and adjusting regenerative braking torque based on an amount of wheel-slippage, wherein the adjusting of the regenerative braking torque is performed through feedback control based on the amount of the wheel-slippage, and includes reducing the regenerative braking torque to be less than the initial regenerative braking torque, in response that the wheel-slippage occurs, wherein, when the adjusting of the regenerative braking torque, the vehicle controller compares the wheel-slippage of a rear wheel in the vehicle with a first rear wheel reference value, a second rear wheel reference value, a third rear wheel reference value, and a rear wheel limit reference value, wherein the first, second, and third rear wheel reference values and the rear wheel limit reference value have progressively increasing wheel-slippage reference values, and wherein the adjusting of the regenerative braking torque includes operating an electric brake-force distribution function for hydraulic braking in response that the amount of the wheel-slippage of the rear wheel in the vehicle is greater than the first rear wheel reference value and less than the rear wheel limit reference value.

12. The braking control method of claim 11, wherein the regenerative braking torque is a sum of a coasting regenerative braking torque and an allowable regenerative braking torque, wherein the coasting regenerative braking torque is configured to be a predetermined constant value, and wherein the allowable regenerative braking torque is determined through the feedback control.

13. The braking control method of claim 11, wherein the adjusting of the regenerative braking torque includes detecting an amount of the wheel-slippage of the rear wheel in the vehicle.

14. The braking control method of claim 11, wherein the adjusting of the regenerative braking torque includes ending the adjusting of the regenerative braking torque in response that the regenerative braking torque adjusted through the feedback control is equalized to the initial regenerative braking torque.

15. The braking control method of claim 11, wherein the vehicle controller is further configured to release the regenerative braking in response that the regenerative braking torque determined by the feedback control is less than a predetermined coasting regenerative braking torque.

16. The braking control method of claim 11, wherein, in response that the regenerative braking torque determined by the feedback control is within a determined range of the initial regenerative braking torque, the vehicle controller is further configured to terminate the feedback control.

17. The braking control method of claim 11, wherein, in response that an amount of the wheel-slippage of the rear wheel is greater than a rear wheel reference value and less than the rear wheel limit reference value, the vehicle controller is further configured to operate an anti-lock braking system.

18. The braking control method of claim 17, wherein, in response that the anti-lock braking system operates, the vehicle controller is further configured to adjust the regenerative braking torque to be a predetermined value.

\*    \*    \*    \*    \*